United States Patent Office

3,518,345
Patented June 30, 1970

3,518,345
TABLETING LUBRICANT
Allen I. Dines, Columbus, Ohio, and Willard Gene Brown, Stockton, Calif., assignors to Miles Laboratories, Inc., Elkhart, Ind., a corporation of Indiana
No Drawing. Filed Oct. 5, 1967, Ser. No. 672,978
Int. Cl. A61j 3/10; A61k 11/02, 15/12
U.S. Cl. 424—44                                    3 Claims

ABSTRACT OF THE DISCLOSURE

An improvement in the process of compressing powdered tabletable materials is gained by mixing with said materials prior to tableting, a lubricant comprising dry-mixable particles each having a core containing a lubricating oil and a coating of an oil-insoluble film-forming substance. The lubricant acts as bath a punch face lubricant and as a diewall lubricant for said tabletable materials. The powdered tabletable materials lubricated with the above lubricant can be those intended for ingestion, such as for alkalizing of the stomach, or those intended for external use, such as for the general cleaning of solid surfaces.

BACKGROUND OF THE INVENTION

This invention relates to a tableting lubricant which can be mixed with a powdered tabletable material to provide lubrication during the compression thereof into tablets. More particularly, it relates to the use of a lubricant comprising dry-mixable particles having cores containing a lubricating oil and a coating of an oil-insoluble film-forming substance.

Tableting lubricants perform the general function of providing (1) lubrication for the punch surfaces which come into contact with the compressed composition and (2) lubrication for the surfaces of the diewalls in which the tablet is formed. Both of these lubrication functions must be satisfied if the powdered tabletable material of interest is to be tableted commercially by the use of high speed power-driven tableting machines. Some prior lubricants have provided only one of these two necessary lubrication functions and hence have necessitated joint use with other lubricants. A general problem with these prior lubricants has been their insolubility which causes a tablet containing the same to produce surface scum when disintegrated in water and to produce a mixture which exhibits a non-uniform, clouded suspension. Talc and magnesium stearate are examples of such lubricants. Other known lubricants are precluded in one or more marketing areas because of their toxicity. Examples are boric acid and benzoic acid. Some tableting lubricants such as sodium benzoate have therapeutic action and therefore alter the pharmacological acceptability of tablets in which they are included.

A lubricant which has found use in small scale, low volume production is corn oil. The main drawback, with respect to the use of such an oil for a lubricant is that it can only be added in small quantities to the tabletable composition since it tends to wet the composition and, hence renders mixing of the composition difficult. To aid in distribution of the small quantities of oil dilution with various solvents has been tried with the result that special equipment and added processing were necessary. Consequently, corn oil lubricants have not attained widespread use.

It has now been found that lubricating oil particles can be coated with a coating of an oil-insoluble film-forming substance in order to make such particles dry-mixable, whereby they may be incorporated into powdered tabletable materials to provide lubrication during high speed tableting of the same. When these coated oil particles are mixed with a dr ymaterial, the resulting mixtures are essentially free-flowing and are easily tableted.

It is, therefore, an object of this invention to provide an improved tableting process in which coated oil particles are mixed with a powdered tabletable material prior to compression of said material into tablets.

Another object of the present invention is to provide a tableting lubricant for tabletable powdered materials which comprises dry-mixable particles of a lubricating oil coated with an oil-insoluble film-forming substance.

Yet another object of this invention is to provide a process by which said dry-mixable coated oil particles can be manufactured.

SUMMARY OF THE INVENTION

The coated oil particle lubricant can be used with powdered tabletable materials to provide tableting lubrication therefor. For tabletable materials which heretofor could be tableted only on slow speed tableting machinery or by hand, the lubricant of the present invention, when mixed therewith prior to compression, provides both internal compression lubrication and some surface lubrication and permits high speed tableting of the material. While various amounts of the lubricant can be mixed with such materials depending upon the presence therein of other ingredients which impart lubrication and depending upon the tableting speed desired, it is usually sufficient to use at least about 0.5% of the lubricant based on the weight of the lubricated tabletable material. If desired, the lubricant can be used in large amounts, approaching the limit of about 50% of the total tablet weight at which point excess lubricating oil is evident on the tablet surface which is generally undesirable. Preferably, less than 5% of the lubricant is employed.

The coated oil particles of the present invention have average diameters of about from 1 micron to 50 microns. The amount of the film-forming substance used is less than that necessary to coat the oil particles with a continuous thick, resinous coat. The use of a minimal workable amount of the film-forming material with respect to the oil is preferred, but is not a critical feature of the invention. However, the relatively thin coating thus produced appears to allow improved lubrication.

A primary advantage of the tableting lubricant of the present invention is its dry-mixable character which renders it easily mixed and homogenized with various powdered tabletable materials. This characteristic may be define das the ability of the lubricant to be homogeneously mixed with dry powders as if it were itself a completely dry powder. This characteristic does not imply that the particles alone are completely free-flowing but rather that when mixed with at least an equal weight of a dry powder for tableting the mixture are free-flowing. When the lubricant particles are dispersed in water no surface scum is produced and the solution produced is uniform.

The tabletable materials which can be lubricated with the coated oil particles can be any materials which are cohesive enough when compressed to form and retain a tablet shape. Such materials can, for example, be disinfectants, germicides or oral hygienic compositions, which disintegrate when placed in water to form solutions of various types. Inclusion of quaternary ammonium compounds such as cetylpyridinium chloride are particularly useful due to their surface tension reducing properties as well as their bactericidal properties. The preferred materials are water-soluble tabletable compositions which are capable of dissolving to produce clear solutions, especially effervescent mixtures comprised of an alkali metal carbonate or bicarbonate and an acid such as malic, citric or tartaric acid, which mixtures are capable of rapidly releasing carbon dioxide upon addition of water thereto. When the carbon dioxide has been released, the solution formed is useful for its alkalizing properties when taken orally. Uniform appearance is a desirable characteristic for such solutions.

Various therapeutic compositions can also be tableted by use of the coated oil particles. Such compositions can be composed of at least one therapeutic agent, a water-soluble excipient, and any necessary coloring agents, flavoring agents, diluents, binders or distintegrators. If necessary, binders may be added to the tabletable composition to promote cohesion. Also compositions for the production of effervescent tablets for producing flavored beverages can be lubricated by the coated oil lubricant. All of such compositions presently known are tabletable in that they are cohesive when compressed; however, most of such compositions can be tableted only by hand, since they cause binding and scoring of the punches and dies of power-driven tableting machines. In order to attain commercial production speeds at tableting lubricant such as that of the present invention must be employed to reduce surface friction and internal compression friction.

The coated oil particles of the present invention can be used as the sole lubricant or can be employed in conjunction with other lubricants when such as included in the tabletable composition, since the coated oil particles are compatible with other lubricants. Moreover, the coated lubricant oil particles can be substituted in whole or in part for various other materials which function as tablet lubricants during compression. Also the coated lubricating oil particles may be made from nontoxic materials, which are generally accepted for use in pharmaceutical and food preparations.

When amounts of the coated oil particle lubricant of about 0.5 to 2% of the weight of the lubricated tabletable material are employed tableting rates from the low noncommercial rates up to about 5,000 tablets per minute on rotary tableting machines containing 49 punch and die sets can be employed. Each punch and die set produces approximately 102 tablets per minute in such machines. On a rotary machine containing 33 punch and die sets tablets may be compressed at a rate of 76 tablets per minute per set for a total production of about 2,500 tablets per minute. Generally, amounts of at least 0.5% of the coated oil particle lubricant based on the total weight of the lubricated tabletable material are sufficient to allow high speed tableting. When amounts of the lubricant up to about 5% are employed the amount of oil is so small that the oil is completely dispersible in the solution formed and hence a uniform solution results. When the lubricant is used as one of two or more tableting lubricants a proportionally smaller amount may be employed.

The coated lubricant oil particles are manufactured by the steps of (1) preparing at room temperature, an oil-in-water emulsion of the lubricating oil which contains in the water phase, an oil-insoluble film-forming substance in the proportion of about 1 to 9 weight parts per one weight part of the lubricating oil, (2) maintaining the emulsion at about 15° C. or above, (3) spraying the emulsion into a moving air stream having an initial temperature prior to contact with the emulsion of about from 150° C. to 290° C., (4) drying the emulsion to a moisture content of about 2 to 10% and (5) collecting the dried, coated oil particles. The proportion of 2 to 4 weight parts of the film-forming substance per 1 weight part of the lubricating oil is preferred in order to remain well below the 9:1 limit where the oil content becomes insufficient. A final water content of about 3 to about 5% and temperatures in a range of about 15° C. to about 40° C. for step (2) are preferred.

Further, it has been found that the higher air temperatures, in the range of about 240° C. to about 265° C. are preferred. The drying process can be carried out by allowing the emulsion to be sprayed into the moving air stream at a low pressure differential from a rotating spray wheel or a nozzle.

The moisture content of the coated oil particles can be readily controlled by varying the emulsion flow rate at a constant air temperature and air flow rate. Conversely the emulsion flow rate can be held constant and the air flow rate varied. The air stream does not have to be specially dried in order to have low humidity, since the equilibrium humidity at temperatures in the above range is sufficiently low to provide quick drying of the excess water from the emulsion formed.

The process of drying is preferably carried out in standard spray-drying equipment wherein an emulsion outlet is associated with a distribution wheel which spins the emulsion out into the gas space enclosed by the apparatus. In such apparatus the wheel is spun at about 40,000 r.p.m. by an electric motor or by application of air pressure to a turbine connected with the wheel. The inlet ports for the heated air stream are spaced near the distribution wheel and the dry-mixable coated oil particles are collected as a powder at the bottom of the spray drying apparatus. A cyclone separator can be employed to separate the particles from the air stream if desired. Most driers have at least one secondary recovery cyclone separator. The air as it leaves the drier with the particles has a temperature of about 70° C. to 115° C.

While spray drying is the preferred process, other methods such as lyophilization can also be used to dry the emulsion.

The emulsion for the above process can be prepared by making a solution of a water-soluble oil-insoluble film-forming substance with as little water as necessary in order to form the solution, adding thereto the lubricating oil and emulsifying by vigorous agitation. Other orders of addition can also be employed. Additional water may be added to the thus formed emulsion in order to attain the desired spray characteristics, with the caution that water should not be added to the point where the ability to drive off such water is exceeded. Also, non-aqueous continuous phases can be used for the emulsion providing such are compatible with all components.

The film-forming substance can be any of a broad range exemplified by: water-soluble gums, modified celluloses, proteinaceous materials, polymeric sea plant derivatives, agar-agar, or synthetic film-forming substances such as polyvinylpyrrolidone. The water soluble gums can be gum arabic (gum acacia), pectin, gum tragacanth, gum karaya, guar gum, locust bean gum, and starch gum (destrin) in either natural or modified form such as carboxylated dextrin. The modified celluloses can be ethers or esters such as hydroxypropyl methyl cellulose or carboxymethyl cellulose. Proteinaceous materials which may be employed are, among others, gelatin, albumin and casein. Various polymeric sea plant derivatives such as algins, alginates and carragheenates can also be employed. The synthetic film-forming substances can be either water-soluble or water dispersible.

Generally, these substances are polymeric in nature and form resinous layers about the oil particles upon being dried. They are also oil-insoluble in the lubricating oil with which they are used and are, preferably, water-soluble for convenience in forming the emulsion.

The dextrins or starch gums are pratically preferred for the film forming material since they are highly oil-insoluble and water-soluble and release bound water in a rapid manner during spray drying.

The lubricating oil which is coated with the above film-forming substance can be any of the normally employed viscous vegetable, animal, synthetic or mineral oils including those which have been heretofore used for providing tableting lubrication. Examples of vegetable oils are those obtained from the following sources: corn, cotton seeds, coconuts, peanuts, olives, soy beans, sun-flower seeds, flax seeds, palm kernels, safflower seeds, etc. Examples of animal oils are: seal, whale, cod liver, and neat's-foot oils. Examples of synthetic oils are polyethylene glycols of the molecular weight range 250 to 2000. The mineral oils usable are those which are highly purified, such as refined petroleum distillate. These oils may be hydrogenated as desired to provide greater saturation of the fatty acid moieties thereof.

It is generally preferred to employ such hydrogenated oils having viscosities in the range of 120 to 140 centipoises (cps.) and having good heat and oxidative stability. Such oils are resistant to microbial attack and do not change chemically during the spray drying process. Purified or refined oil of the same viscosity range are also preferred since their properties can be reproducibly controlled.

Another variation of this invention is to incorporate any desired flavoring agents into the oil prior to forming the coated oil particles. Essential oils are particularly suited for this manner of inclusion into the lubricant particles.

DESCRIPTION OF THE PREFERRED EMBODIMENT

The preferred lubricant particles are made by spray drying an emulsion formed from a mixture of a heat and air (oxygen) stable refined vegetable oil having a viscosity in the range of about 120 to 140 cps. and a starch gum solution. The emulsion is dried by spraying it into an air stream maintained at about 150° C. to 265° C. which leaves the spray drier at a temperature of about 110±5° C. The resulting coated oil particles have a moisture content of about 2 to 4 weight percent, are dry-mixable with powdered materials and provide lubrication for the same upon tableting.

These and other aspects of the present invention will be apparent to those skilled in this art from the following examples which are intended to be illustrative and not limitative. The concentrations of components are stated as weight percent of the weight of the lubricated material as tableted. Many of the illustrative examples show use of the coated lubricant particles in effervescent formulations since the attainment of lubrication in such systems is known to be difficult and therefore, proof of such use is a vigorous test of performance of a tableting lubricant.

EXAMPLE I

| Table components | Weight g. | Weight percent |
|---|---|---|
| Gum acacia | 1,600 | 20 |
| Peanut oil | 400 | 5 |
| Deionized water | 6,000 | 75 |
| Total | 8,000 | 100 |

A solution of the gum acacia was made by adding the deionized water thereto. The emulsion was formed by mixing the peanut oil with this solution in a laboratory blender at room temperature.

The emulsion was dried in a standard spray drier having an atomizing wheel centrally disposed in the upper portion of the drying chamber, an air inlet port equipped with a heater spaced directly below the atomizing wheel, and an outlet port at the bottom of said chamber for removing the particles and the air. The emulsion was fed through a conduit tube from a holding tank to the atomizing wheel and the coated oil particles were collected by a cyclone separator connected to the outlet port. The drier used was a Nerco-Niro portable spray drier manufactured by Nichols Engineering and Research Corporation, New York, N.Y.

The emulsion was used at about room temperature and was placed in the holding tank and agitated until it was fed to the atomizing wheel.

The inlet air temperature was maintained at 220° C. to 230° C. and its flow through the chamber was at a rate sufficient to reduce the moisture of the dried lubricant particles to about 2% to 4% by weight. The exit air temperature was 70° C. to 80° C.

The atomizing wheel was rotated at about 40,000 r.p.m. by supplying air to a connected drive turbine at a pressure of 5.8 to 6.2 kg./cm.$^2$.

The weight of the coated oil particles collected at the bottom of the spray drier was 1880 g., indicating a weight loss of 76.5% based on the emulsion weight. The dried particles had a moisture content of 4.45% (determined by toluene distillation) due to the retention of bound and partially bound water by the gum acacia. The moisture was further lowered to about 4% by drying the particles in a forced air oven at about 50° C. for 16 hours. The weight ratio of gum acacia to the oil in these particles was about 4 to 1.

The spray dried coated oil particles were then used to provide lubrication for effervescent beverage tablets of the following formulation.

Tablet formulation: Weight g.
(1) Coated oil particles _____ 819.0
(2) Citric acid (anhydrous) _____ 4368.0
(3) Sodium bicarbonate _____ 2910.0
(4) Cherry flavoring _____ 45.0
(5) FD and C Red No. 2 dye _____ 56.1
(6) Tartaric acid _____ 330.0
(7) Ascorbic acid _____ 30.0
(8) Sodium cyclohexylsulfamate _____ 342.0
(9) Sodium saccharin _____ 84.0

Total _____ 8984.1

The lubricated tabletable composition was prepared by separately drying all components except the citric acid and then mixing the coated oil particles with components 3 and 4. The remainder of the components were then blended with this premix and the formulation tableted at a commercial rate on a single punch tableting machine with the result that good lubrication was achieved. The tablets were one inch diameter and were compressed to a hardness of about 3 to 3.5 kg. as measured by a Stokes hardness tester. The average tablet weight was about 3 g. for a total of nearly 3,000 tablets.

Another smaller batch of the above formulation was prepared with similar coated oil particles except that no drying of the components was carried out. The formulation was likewise tableted on a single-punch press at a commercial rate to an average hardness of about 3.9 kg. The tablets were one inch in diameter and an average of 0.156 inch thick. During tableting good flow of the formulation from the hopper into the die cavity was experienced. The formulation contained 9% by weight of the coated oil particles for a total of 273 mg. on the basis of the individual tablet weight.

A number of these tablets were dissolved in water at about 3° C. to 5° C. with the result that the average disintegration time was about 150 seconds. Upon dissolution the tablets produced a cherry flavored effervescent beverage. The oil content in these tablets was about 54.6 mg. oil per tablet.

It was significant that the lubricant particles provided adequate lubrication for the effervescent beverage formulations which could only have been tableted by hand, if at all, in the absence of the coated oil particles. Further, the coating of the oil particles with the film-forming gum acacia rendered them dry-mixable in which condition they could be directly mixed with the other dry ingredients of the formulation and tableted without difficulty.

EXAMPLE II

| Emulsion components | Weight, g. | Weight percent |
|---|---|---|
| Starch gum (dextrin) | 222.2 | 22.22 |
| Refined vegetable oil | 111.2 | 11.12 |
| Distilled water | 666.6 | 66.66 |
| Total | 1,000.0 | 100.00 |

The starch gum used was a stable corn dextrin obtained from National Starch and Chemical Company Inc., New York, N.Y., under the trade name of "Nadex 772." It has the following characteristics: viscosity, 120 to 140 cps.; particle size, 98% of the powdered gum passes through a 40 mesh screen (U.S. Standard); and color, light tan.

The vegetable oil was obtained from Durkee Famous Foods, Inc. Cleveland, Ohio under the trade name "Durkex 500." It is a high quality refined domestic vegetable oil having good heat and air (oxygen) stability and resistance to microbial attack. The free fatty acids content was 0.05% maximum, the oxygen stability was 450–500 hrs. as measured by the Active Oxygen Method (Tenative Method Cd 12–57, revised 1959 published in "Official and Tentative Procedures of the American Oil Chemists Society;" 3rd Ed., 1966, Chicago, Ill.), and the Wiley melting point was $22\pm2°$ F. The major contents of the fatty acids moieties were: palmitic 8 to 10%, stearic 2 to 4%, oleic 43 to 47% and elaidic 39 to 43%, and linoleic 1 to 3%.

The starch gum was placed in a planetary mixer, the oil added thereto, and the resulting mixture stirred at a high speed. When the oil appeared uniformly dispersed two-thirds of the water was added and the mixing was continued. When a uniform dispersion was formed, the remaining water was added and the entire mixture was transferred to a mixer until a homogeneous emulsion was formed.

This emulsion was spray-dried in a manner similar to that employed for Example I, above. The air inlet temperature was $210\pm5°$ C. with an average of 212° C. to 213° C. The atomizing wheel was rotated at 40,000 r.p.m. and the coated oil particles were collected at the bottom of the drier as a relatively dry powder. The exit air temperature was $110\pm5°$ C. No further drying of these particles was found to be necessary. The coated particles had a weight ratio of starch gum to vegetable oil of 2 to 1.

The coated oil particles were then used to lubricate tablets having the following formulation.

| Tablet formulation: | Weight, g. |
|---|---|
| (1) Coated oil particles | 37.5 |
| (2) Citric acid (anhydrous) | 1456.0 |
| (3) Sodium bicarbonate | 970.0 |
| (4) Lemon-lime flavor | 40.0 |
| (5) FD and C Blue No. 1 dye | 0.5 |
| (6) FD and C Yellow No. 5 dye | 5.0 |
| (7) Tartaric acid | 110.0 |
| (8) Ascorbic acid | 10.0 |
| (9) Sodium cyclohexylsulfamate | 114.0 |
| (10) Sodium saccharin | 28.0 |
| Total | 2771.0 |

The formulation was prepared by drying all components except 1 and 4. Components 1, 4, 5 and 6 were mixed and passed through a sieve screen until uniform. Then components 3 and 7–10 were added in order of their decreasing amounts and the resulting mixture blended with the citric acid (component No. 2). The mixed formuation was tableted at a commercial rate on a single-punch machine.

The tablets produced had high strengths of 4.5 to 5.5 kg. as measured on a standard Stokes hardness tester. The tablets had an average weight of 2.771 g. and were one inch in diameter and about 0.145 inch thick. The tablets disintegrated in 16° C. water in 60 to 65 seconds. Upon dissolution the tablets produced a lemon-lime flavored effervescent beverage which had a pleasing taste. No oily taste could be perceived in the beverage by a panel of five persons each of whom tasted samples of beverages produced with four different tablets.

The concentration of the coated oil particles in the formulation prior to tableting was about 1.36% on the basis of the non-lubricated materials or about 37.5 mg. per tablet. The concentration of oil in the tablets was 12.5 mg. per tablet which is low enough so that this amount is dispersible in the volume of water used to dissolve the beverage tablet.

The tablets produced were considered well lubricated and the formulation used for their production handled easily, resulting in the conclusion that the coated particle lubricant provide adequate lubrication for this difficulty tabletable composition.

EXAMPLE III

| Emulsion components | Weight, g. | Weight percent |
|---|---|---|
| Starch gum (dextrin) | 1,333.3 | 22.22 |
| Refined vegetable oil | 666.6 | 11.12 |
| Distilled water | 4,000.0 | 66.66 |
| Total | 6,000.0 | 100.00 |

The starch gum and the oil were the same as used for Example II, above. The vegetable oil was placed in a planetary mixer and the powdered starch gum was added thereto with mixing at a low speed. Two-thirds of the water was then added and the low speed mixing continued until a primary emulsion was formed. The remaining water was added with continued mixing at increasing speeds. The mixture was then transferred to a homogenizer and mixed until a thoroughly homogeneous emulsion was formed.

This emulsion was introduced into a spray drier and dried in a manner similar to the process described in Example I, above. The air inlet temperature was held at $210\pm10°$ C. while the exit temperature was $110\pm10°$ C. Approximately 1350 g. of dry-mixable coated oil particles were obtained. The particles had a weight ratio of starch gum to oil of 2 to 1.

Three parts of this coated oil product were mixed with one part of a coated lubricant which was a product of a run made with the same emulsion at the same drying conditions, except for the exit air temperature which was $100\pm10°$ C. The resulting mixture was used in the tablet formulation set out below:

| Tablet formulation: | Weight, g. |
|---|---|
| (1) Coated oil particles | 200.0 |
| (2) Citric acid (anhydrous) | 5824.0 |
| (3) Sodium bicarbonate | 3880.0 |
| (4) Tartaric acid | 440.0 |
| (5) Sodium cyclohexylsulfamate | 456.0 |
| (6) Sodium saccharin | 112.0 |
| (7) Ascorbic acid | 40.0 |
| (8) Lemon-lime flavor | 160.0 |
| (9) FD and C Yellow No. 5 dye | 20.0 |
| (10) FD and C Blue No. 1 dye | 2.0 |
| Total | 11,134.0 |

Components 2–7 were separately dried and components 6 and 7 were then blended with components 9 and 10 in a mortar prior to adding components 1, 4, 5 and 8. The lubricated mixture was then further mixed by hand screening and transferred to a blender. Components 2 and 3 were added and the dry mix blended for 5 minutes. The blended mixture was stored in double walled polyethylene bags in a low humidity area prior to tableting.

The mixture, containing 1.82 percent of the spray-dried coated oil particles on the basis of the weight of the non-lubricated materials, was tableted on a single punch machine. These tablets were one inch in diameter and 0.137 inch thick. They disintegrated in 4° C. to 5° C. water in an average of 100 seconds and showed a hardness of 4 to 5 kg. as measured on a hardness tester.

Some of the tablets were packaged in covering pieces of a metal foil-polymer laminate by heat-sealing peripheral areas of the pieces. These packaged tablets were subjected to a stability study in which different groups were stored at room temperature, R.T., (22° C.) at 40° C. and at 50° C. The properties and characteristics measured were the tendency for the foil package to puff, taste and odor of the beverage formed upon disintegration, tablet appearance, disintegration characteristics, tablet hardness, and weight of ascorbic acid per tablet. The tendency to puff is determined by measurements of the package thickness. Appearance is a determination of change in the surface color of the tablet. The disintegration characteristics measured were the time required for disintegration in water, the length of time required for the effervescing tablet to rise to the surface of the water, and the amount of solid residue remaining in the bottom of the body of water.

A panel of eighteen persons tested the beverages resulting from disintegration of the tablets for taste and odor characteristics. The test beverages were compared with control beverages formed by dissolution of tablets stored at 4° C. The test beverage and control beverage were presented so that each member of the panel tested a total of three beverages and at least one each of a control and a test sample. If twelve members could not pair two of the beverages with respect to taste or odor, no significant difference (NSD) between the control and that test sample was recorded. The tablet hardness was tested on a standard Stokes hand tester and the weight of ascorbic acid per tablet was determined by conventional analysis.

The testing program was conducted for one year at room temperature, 3 months at 40° C. and one month for 50° C. The results are set out in Table 1, below, wherein only partial testing was carried out in the early periods according to established procedure for testing such tablets.

sprayed into a moving air stream which was maintained at 210±5° C. inside of a spray drier. The coated oil particles were collected at the bottom of the drier as a dry-mixable powder and they had a weight ratio of gum acacia to vegetable oil of about 4 to 1. The quantity of coated oil particles produced was 248 g. The exit air temperature was 110±5° C.

A portion of this spray-dried product was successfully employed to provide lubrication for water-solids tabletable compositions which were tableted at a commercial rate. The concentration of the coated oil particles was about one percent by weight based on the non-lubricated tabletable composition.

EXAMPLE V

| Emulsion components | Weight, g. | Weight percent |
|---|---|---|
| Refined vegetable oil | 1,000 | 11.11 |
| Starch gum (dextrin) | 2,000 | 22.22 |
| Distilled water | 6,000 | 66.67 |
| Total | 9,000 | 100.00 |

The vegetable oil was placed in a planetary mixer and the starch gum was added thereto. The components were the same type as described in Example II, above. The

TABLE 1.—TABLET STABILITY TESTS

| | Package thickness, inches | | | Appearance | | | Disintegration characteristics | | | | | |
|---|---|---|---|---|---|---|---|---|---|---|---|---|
| | | | | | | | Disinteg. time, sec. | | | Rise time, sec. | | |
| Tablet age | R.T. | 40° C. | 50° C. | R.T. | 40° C. | 50° C. | R.T. | 40° C. | 50° C. | R.T. | 40° C. | 50° C |
| Original | 0.148 | | | Light green | | | 124 | | | 86 | | |
| Two weeks | | | 0.149 | SD | | SD | | | 145 | | | 106 |
| One month | | 0.143 | 0.145 | | NC | D | | 107 | 150 | | 87 | 118 |
| Three months | 0.150 | 0.152 | | NC | SF | | 115 | 140 | | 86 | 106 | |
| Six months | 0.145 | | | NC | | | 68 | | | 46 | | |
| One year | 0.146 | | | NC | | | 72 | | | 52 | | |

| | Disintegration characteristics residue, grains | | | Taste and odor test [2] | | Tablet hardness, kg. | | | Weight of ascorbic acid per tablet, mg. | | |
|---|---|---|---|---|---|---|---|---|---|---|---|
| Tablet age | R.T. | 40° C. | 50° C. | R.T. | 40° C. | R.T. | 40° C. | 50° C. | R.T. | 40° C. | 50° C |
| Original | 3 | | | | | 58 | | | 10.0 | | |
| Two weeks | | | 4 | | | | 11.5 | | | | 10.0 |
| One month | | 1 | 1 | NSD | | | 7.7 | 11.5 | | | 10.2 |
| Three months | 0.1 | 0.1 | | NSD | | 6.6 | 8.5 | | | 9.6 | |
| Six months | 2 | | | NSD | | 7.0 | | | 9.5 | | |
| One year | 0.1 | | | MSD | | 7.3 | | | 10.0 | | |

[1] NC—No Change; SD—Slightly Darker; D—Darkened; SF—Slight Fading.  [2] NSA—No Significant Difference.

From these data it can be seen that storage of the tablets for the specified times did not greatly change the properties and characteristics of the tablets, resulting in the conclusion that the tablets were stable as lubricated and tableted. Hence the coated oil particles were concluded to constitute a commercially acceptable lubricant for tabletable compositions.

EXAMPLE IV

| Emulsion components | Weight g. | Weight percent |
|---|---|---|
| Refined vegetable oil | 66.6 | 6.66 |
| Gum acacia | 266.7 | 26.67 |
| Distilled water | 666.7 | 66.67 |
| Total | 1,000.0 | 100.00 |

The gum acacia was added to the vegetable oil and mixed in a planetary mixer until smooth. The vegetable oil employed was the same as that for Example II, above. Two-thirds (⅔) of the water was then added and the mixer was set at a high speed until a homogeneous condition was attained. The remaining water was added and mixed with the emulsion previously formed. The entire mixture was then transferred to a homogenizer until the emulsification was completed.

The emulsion was maintained at room temperature and mixture was then stirred until smooth and 4000 g. of the water were added and the stirring was continued at a higher speed until a uniform suspension was formed. The remaining water was added with continuous stirring. The mixture was then transferred to a homogenizer and mixed until the emulsion was homogeneous.

The emulsion was then spray dried by spraying it into a moving air stream in a spray drier which entered the drier at a temperature of 210±5° C. Nine (9) hours was required to spray dry the emulsion batch. The coated oil particles recovered weighed 2,225 g. which amounted to 74.08 percent of the original 3,000 g. of solid components. This loss of weight indicated that some of the normally retained water was driven from the starch gum, the cyclone separator of the drier was not removing the smaller particles, and/or that some of the solid matter was volatilized. The final moisture content of the particles was about 2 weight percent.

A coated oil product produced from a second emulsion of the same composition as that described above was stability tested for one year. The stability studies on the lubricant particles are set out in Table 2, below, wherein the percentage water was determined by the Karl Fischer method and the other evaluations have the same meanings as in Table I, above.

TABLE 2

| Tablet age | Appearance | | Taste and odor tests | | Percent H₂O | Oil[1] | |
|---|---|---|---|---|---|---|---|
| | R.T. | 40° C. | R.T. | 40° C. | | R.T. | 40° C. |
| Original | | | | | 2.4 | 26.7 | |
| One month | NC | SD | | NSD | | 25.2 | 24.4 |
| Three months | NC | NC | | NSD | | 24.5 | 24.1 |
| Six months | SD | NC | NSD | | | 25.9 | |
| One year | NC | | NSD | | | 26.7 | |

[1] Determined by ether extraction.

From Table 2 it can be seen that the coated oil lubricant of the type described in this example is stable with respect to its appearance, taste and odor characteristics and its oil content and hence is an excellent lubricant for tabletable compositions.

This coated oil lubricant product can be incorporated into the following type of formulation:

Tablet formulation: Weight, g.
(1) Coated oil particles ................ 300
(2) Citric acid (anhydrous) ........... 17,619
(3) Sodium bicarbonate ............... 26,250
(4) Monocalcium phosphate ........... 3,315

Total .................................. 47,484

Ingredients 2–4 can be separately oven dried and then mixed with ingredient 1. The resulting formulation is tableted on a rotary tableting machine. The resulting tablets show high hardness and an average dissolution time of about 45 seconds in room temperature water. During this tableting, good flow and tableting characteristics are apparent, which indicates that the coated oil particle lubricant of this invention is usable in a concentration as low as about 0.63 weight percent based on the weight of the non-lubricated tabletable ingredients. These tablets will disintegrate in water to produce an alkalizing solution suitable for internal use.

EXAMPLE VI

| Emulsion components | Weight g. | Weight percent |
|---|---|---|
| Polyvinylpyrrolidone | 1,000 | 33.4 |
| Refined vegetable oil | 500 | 16.6 |
| Water | 1,500 | 50.0 |
| Total | 3,000 | 100.0 |

The water was heated to about 50° C. and the polyvinylpyrrolidone (PVP) added thereto with stirring. The lubricating oil was then added to the PVP solution when agitated in a blender. The emulsion was maintained by stirring and fed into a spray drier which was operated at the conditions specified in Example IV, above.

Ten (10) weight parts of the coated oil particles thus produced, were mixed with 500 weight parts of dicalcium phosphate containing a small proportion of sugar and corn starch, and the resulting mixture was blended by passing it through a 24 mesh screen (U.S. Standard). The tablet composition was tableted on a single punch press machine fitted with 15/32 inch diameter punches. The tablets obtained were of excellent quality and demonstrated excellent lubrication during their formation. The tablet is usable for placebo applications.

In summary the coated-oil-particles lubricant is produced by spray drying and is usable to provide lubrication for tabletable compositions.

What is claimed is:

1. A tablet producing a clear aqueous solution and being free from insoluble tablet lubricants or other tablet excipients or components which cause a tablet formed from an otherwise soluble composition to produce a clouded suspension having undesirable surface scum rather than a uniform solution when dissolved in water consisting essentially of a compressed, essentially free flowing mixture of a powdered, water-soluble, tabletable essential active ingredient and, as the essential tablet lubricant, a dry-mixable tableting lubricant comprising lubricating oil particles coated with an oil-insoluble, water-soluble film-forming substance, said lubricating oil particles being selected from the group consisting of vegetable oils, animal oils, mineral oils and synthetic polyethylene glycols of the molecular weight range 250 to 2000, said oil-insoluble, water-soluble film-forming substance being selected from the group consisting of water-soluble gums, modified celluloses, proteinaceous materials, polymeric sea-plant derivatives, agar-agar and synthetic film-forming polymers.

2. The tablet of claim 1 wherein said lubricating oil particles are composed of about from 1 to 9 weight parts of said film-forming substance to 1 weight part of said lubricating oil.

3. A tablet according to claim 1 wherein said powdered, water-soluble, tabletable essential active ingredient is an internal use oral therapeutic agent, effervescent couple alkalizer, effervescent flavored beverage concentrate, quarternary ammonium disinfectant, solution-forming, external use, solid surface general cleansing germicide, mouthwash concentrate or allied oral hygenic composition.

References Cited

UNITED STATES PATENTS

| 2,035,267 | 3/1936 | Fleischman | 424—53 |
| 2,913,373 | 11/1959 | Weisz et al. | 424—52 |
| 3,082,091 | 3/1963 | Smith et al. | 424—44 |
| 3,105,792 | 10/1963 | White | 424—44 |
| 3,136,692 | 6/1964 | Bandelin | 424—44 |
| 3,210,208 | 10/1965 | Grass et al. | 106—148 |
| 3,355,392 | 11/1967 | Cantor et al. | 424—329 XR |
| 3,382,150 | 5/1968 | Grass et al. | 424—32 |

OTHER REFERENCES

Evans et al., A bibliography of the Tabletting of Medicinal Substances," "Lubricants," pp. 102–105 pub. 1963, The Pharmaceutical Press, London, England.

SHEP K. ROSE, Primary Examiner

U.S. Cl. X.R.

424—49, 263, 280, 329; 252—1, 9, 10, 11, 350; 117—100; 264—39, 300, 338; 106—38.22; 206—84; 8—79; 99—77.1, 78, 79, 140, 148